United States Patent
Upadhyaya et al.

(10) Patent No.: US 10,862,939 B2
(45) Date of Patent: Dec. 8, 2020

(54) CUSTOMIZED AND EXTREMELY LOW LATENCY STREAMING FROM THE NETWORK EDGE

(71) Applicant: Verizon Digital Media Services Inc., Dulles, VA (US)

(72) Inventors: Bhavesh Upadhyaya, Redondo Beach, CA (US); Tin Zaw, Santa Monica, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 111 days.

(21) Appl. No.: 16/230,900

(22) Filed: Dec. 21, 2018

(65) Prior Publication Data

US 2020/0204603 A1 Jun. 25, 2020

(51) Int. Cl.
*G06F 15/173* (2006.01)
*H04L 29/06* (2006.01)
*H04L 29/08* (2006.01)

(52) U.S. Cl.
CPC .......... *H04L 65/605* (2013.01); *H04L 65/608* (2013.01); *H04L 65/80* (2013.01); *H04L 67/18* (2013.01)

(58) Field of Classification Search
CPC ..... H04L 65/605; H04L 65/608; H04L 65/80; H04L 67/18
See application file for complete search history.

(56) References Cited

U.S. PATENT DOCUMENTS

| 2015/0085875 | A1* | 3/2015 | Phillips | H04N 21/8456 370/465 |
| 2016/0006836 | A1* | 1/2016 | LeFaucheur | H04L 65/80 709/203 |
| 2016/0337680 | A1* | 11/2016 | Kalagi | H04L 65/602 |
| 2017/0353516 | A1* | 12/2017 | Gordon | H04L 67/10 |

\* cited by examiner

*Primary Examiner* — Sm A Rahman
(74) *Attorney, Agent, or Firm* — Ansari Katiraei LLP; Arman Katiraei; Sadiq Ansari

(57) ABSTRACT

Streaming improvements are provided by using computing, caching, and/or other resources that are provided at different network edges in a Multi-access Edge Computing ("MEC") enhanced network. A MEC device, at a network edge, may customize a stream passing to a client device via the network edge by identifying a break in an original stream manifest passing to the client device, and by inserting a link for the client device to request and play content that is selected by the MEC device during the break. The MEC device then passes the modified stream manifest, instead of the original stream manifest, to the client device. The MEC device may also be triggered, via a prioritization message from a host in the network, to prefetch, cache, and serve a stream from the network edge to a client device accessing the network via that network edge.

18 Claims, 8 Drawing Sheets

US 10,862,939 B2

CUSTOMIZED AND EXTREMELY LOW LATENCY STREAMING FROM THE NETWORK EDGE

BACKGROUND ART

Multi-access Edge Computing ("MEC") brings computing, caching, and/or other resources closer to the network point of access or the network edge. For instance, in a Fifth Generation New Radio ("5G NR") wireless telecommunications network, MEC may include placing server-like resources at or near the base stations from which different groups of client devices gain network access. The MEC resources may be leveraged to offer new functionality at the network edge, and/or improve existing services by shifting part or all of the service execution to the network edge.

DETAILED DESCRIPTION

The following detailed description refers to the accompanying drawings. The same reference numbers in different drawings may identify the same or similar elements.

Systems and/or methods, as described herein, may improve streaming, and more specifically, the relevance and/or performance of content that is streamed via a data network. In some embodiments, the streaming improvements are implemented using computing, caching, and/or other resources that are provided at different network edges in a Multi-access Edge Computing ("MEC") enhanced telecommunications network and/or data network.

The systems and methods presented herein may use the MEC resources to customize the stream at the network edge with secondary content that is relevant for the network edge location. For instance, some embodiments may produce a modified stream manifest at the network edge, based on an original stream manifest that passes from a stream host (e.g., a stream provider and/or stream distributor), and may provide the modified stream manifest, instead of the original stream manifest, to a requesting client device that accesses the network via that network edge. The modified stream manifest may customize the stream of the original stream manifest by including supplemental secondary content that is selected and/or that is relevant for the network edge location from which the requesting client device requests the stream. In this manner, the supplemental secondary content can be selected for very specific regions, entities, and/or other parameters with a very high degree of location accuracy, and may be geographically relevant even when the client device spoofs its addressing or uses the same address while traveling across different geographic regions of different network edges.

The systems and methods presented herein may also, or alternatively, use the MEC resources to provide a stream directly from the network edge, instead of a stream host that may be several network hops away from the network edge, in order to significantly reduce the latency for stream playback. For instance, some embodiments may configure and/or trigger the MEC resources to request and cache, from one or more stream hosts, a specific subset of tagged and/or important streams at the network edge before clients request those streams. Consequently, when a client issues a request to a stream host for a stream that is cached at the network edge, the request may be intercepted at or routed to the network edge, and served directly from the network edge without traversing the additional network hops to the stream host, thereby allowing playback of the stream to commence on the client device within hundreds of milliseconds after the client issues the request, as opposed to several seconds. Requests for other untagged or less important streams may pass unmodified through the network edge to the stream host.

Figure 1:
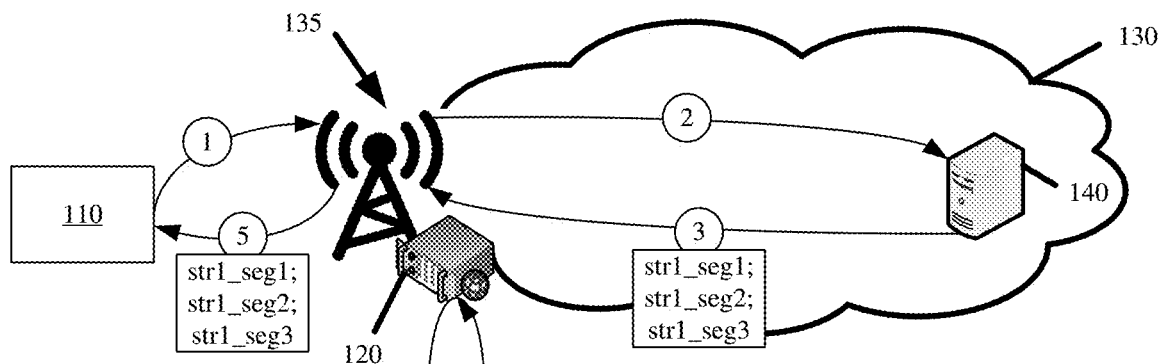
FIG. 1 illustrates an example for modifying the stream manifest at the network edge in order to customize the stream with secondary content that is selected based on the network edge location in accordance with some embodiments described herein.
Figure 1:
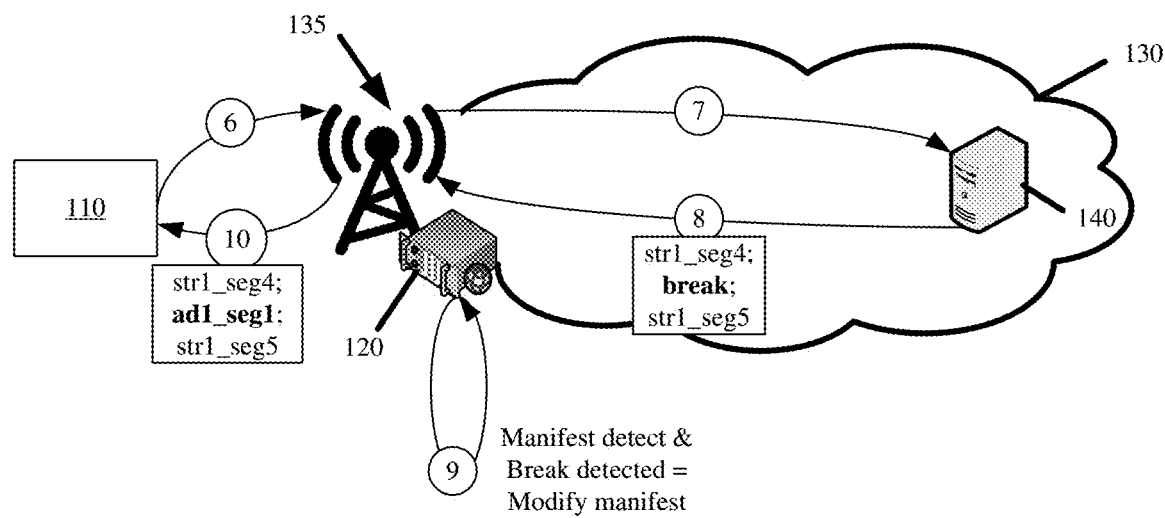
Figure 1:
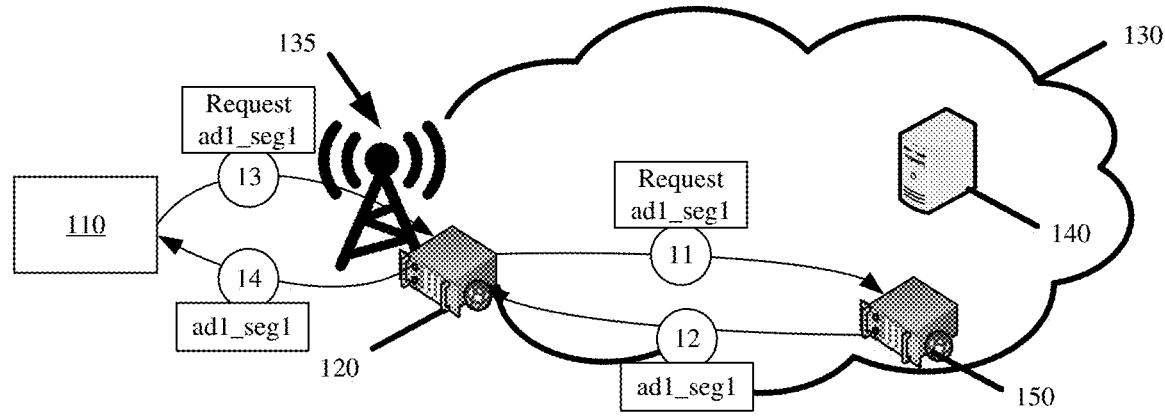

FIG. 1 illustrates an example for modifying the stream manifest at the network edge in order to customize the stream with secondary content that is selected based on the network edge location in accordance with some embodiments described herein. FIG. 1 illustrates client device 110, MEC device 120, network 130, and stream host 140.

Client device 110 may be any network-enabled device that requests, receives, and/or plays content that is streamed to client device 110 via network 130. Client device 110 may use wireless or wired connectivity to access network 130 and to communicate with different hosts (e.g., stream host 140) or devices therein. Client device 110 may include a desktop computer, a laptop computer, a tablet computing device, a smartphone, a set-top box, an Internet-of-Things ("IoT") device, and/or other network-enabled devices.

MEC device 120 may include a device with configurable computing, caching, and/or other resources that execute from edge 135 of network 130. Network edge 135 may represent a network point of access by which one or more client devices 110 gain access to network 130. In FIG. 1, client device 110 accesses network 130 via network edge 135. For instance, network edge 135 may correspond to a gateway router at a home or business, a Radio Access Network ("RAN") of a wireless telecommunications network, or other network access point.

Network 130 may be one or more data networks through which client devices 110 may access content (e.g., media content, streaming content, etc.), services, and/or data that are provided by various stream hosts 140 that are also connected to network 130. In FIG. 1, stream host 140 may be a stream provider or a stream distributor from which client device 110 may request and receive one or more streams. Each stream may encode a duration of video, audio, media, and/or other content as a series of segments (e.g., transport stream segments). Each segment represents a short duration (e.g., 1-5 seconds) of the overall stream. The segments may be requested and decoded in sequential order to render and playback the stream on a client device 110. The segment playlist, or available segments of the stream and the playback order of the streams, may be defined in separate files called manifests. Each manifest may list the segments and/or links to the segments that encode a particular duration of the overall stream. Based on the manifest, client device 110 may determine the next set of segments to request from stream host 140. The manifest may provide additional information about the stream and/or each segment including, for example, a quality or resolution of each segment, segment duration, and segment file size. Stream host 140 may operate one or more devices to generate, store, and/or serve the one or more streams to requesting client devices 110.

As shown in FIG. 1, client device 110 may submit (at 1) an initial request for a particular stream. For instance, the initial request may be a HyperText Transfer Protocol ("HTTP") GET message, and may include a Uniform Resource Locator ("URL") that specifies a name or file of the particular stream. The initial request may be directed to stream host 140 by including network addressing of stream host 140 in the request header, and/or based on a domain name in the URL resolving to a network address of stream host 140.

The initial request may pass through network edge 135 and/or MEC device 120 and into network 130 where it is routed (at 2) through multiple network hops (e.g., routers) until arriving at stream host 140. Stream host 140 may provide (at 3) a first manifest in response to the request.

The first manifest may be a file (e.g., *.m3u8 file) that includes a segment playlist. For a live stream, the first manifest may identify the names, URLs, links, and/or other identifiers for a next set of segments of the live stream. The next set of segments may, for example, correspond to the most recent five seconds of the live stream. For an on-demand stream, the first manifest may identify the names, URLs, links, and/or other identifiers of all segments or a set of segments at the current playback position. As noted above, the first manifest may provide other information including names, URLs, links, and/or other identifiers for segments at different bitrate or quality encodings, information about one or more segments (e.g., segment duration, segment resolution, etc.), metadata, and/or other information about the segments or stream.

The first manifest may be routed (at 3) through network 130 until it arrives at network edge 135. MEC device 120 may inspect the traffic passing to client device 110 and/or other client devices accessing network 130 through network edge 135. In particular, MEC device 120 may inspect the traffic to identify and/or intercept stream manifests within the traffic. In some embodiments, MEC device 120 may identify and/or intercept manifests for a set of streams that are to be customized with secondary content that is selected and inserted at the network edge 135. Manifests for other streams not in the set of streams may pass through MEC device 120 and network edge 135 unmodified. In some other embodiments, MEC device 120 may identify and/or intercept manifests for streams of a set of stream hosts that have requested or otherwise configured the network edge stream customization.

MEC device 120 may detect (at 4) the first manifest based on the first manifest file extension, the first manifest file format, addressing of source host 140, and/or other parameters from the headers and/or body of the one or more packets encapsulating the first manifest. MEC device 120 may further detect (at 4) that the first manifest is for a stream that is to be customized at the network edge, or is from a stream host (e.g., stream host 140) that has requested the network edge customizations performed by MEC device 120.

In response to detecting (at 4) the first manifest, MEC device 120 may inspect (at 4) the first manifest to determine if the first manifest contains or specifies any breaks in the playback of the primary content for the stream. The primary content may include the segments that encode the requested stream. A break may include a point at which playback of the primary content is interrupted in order to play secondary content. The breaks may correspond to advertisement breaks, and the secondary content may include advertisements that are played during those advertisement breaks. The secondary content may also include slate content for a blacked-out portion of the stream, substitute content, and/or other content.

In some embodiments, MEC device 120 may identify the breaks from specific markers or tags in the first manifest. For instance, the first manifest may include SCTE-IN/OUT, CUE-IN/OUT, and/or other tags, markers, or identifiers to indicate one or more breaks. Each such break may also include the EXT-X-CUE-OUT tag, the EXT-X-DATERANGE tag, or another tag, marker, or identifier to define the duration of the break, and therefore the duration of the secondary content to fill the break. In some embodiments, MEC device 120 may identify a break in the primary content based on differences between domain names, URLs, links, or other identifiers of different segments listed in the first manifest. For instance, a first set of segments in the first manifest may be directed to a first domain name (e.g., that resolves to an address of host provider 140), and a second segment, before, within, or after the first set of segments, may be directed to a different second domain name (e.g., that resolves to an address of an advertiser).

In response to detecting (at 4) that the first manifest does not include any breaks, MEC device 120 may forward (at 5) the first manifest unmodified through network edge 135 to client device 110. Client device 110 may then request, receive, and playback (not shown) the segments identified in the first manifest.

At a later time, client device 110 may request (at 6) a second manifest of the same stream from stream host 140. For instance, client device 110 may request the second manifest from stream host 140 once client device 110 has requested and received some or all of the segments identified in the first manifest. Playback of a live stream on client device 110 may involve client device 110 continually requesting a next manifest to obtain the next set of segments that are generated ahead of the playback position of the live stream. Client device 110 may alternatively request the second manifest from stream host when jumping to a different position in the stream, when changing to a different quality encoding of the stream, when restarting or changing streams, and/or for other reasons. Here again, the manifest request is submitted through network edge 135.

The request routes (at 7) through network 130 until it reaches stream host 140. Stream host 140 responds by providing (at 8) the second manifest to client device 110 via network 130. MEC device 120 detects (at 9) the second manifest, and may intercept (at 9) the second manifest for inspection. In this instance, the inspection reveals a break in the playback of the primary content.

In response to identifying the break, MEC device 120 may modify (at 9) the second manifest. In some embodiments, modifying (at 9) the second manifest may include inserting, into the second manifest at the location of the identified break, a link, URL, or other identifier for secondary content that is selected by MEC device 120. More specifically, MEC device 120 may insert into the second manifest, one or more URLs, links, or other identifiers for one or more manifests, segments, and/or files of the selected secondary content.

In some embodiments, modifying (at 9) the second manifest may include replacing a first set of links, URLs, or other identifiers for secondary content in the original second manifest, inserted by source host 140, with a different second set of links, URLs, or other identifiers for second content that is selected by MEC device 120. For instance, MEC device 120 may replace a link to a first advertisement, that is selected by source host 140, with a link to a different second advertisement, that is selected by MEC device 120.

MEC device 120 may select the secondary content based on the location of network edge 135. For instance, MEC device 120 may insert an advertisement for a business that is within a specific distance from network edge 135. MEC device 120 may be configured with a set of secondary content that is predetermined to be relevant for client devices 110 operating from network edge 135. In some embodiments, MEC device 120 may submit a query with a location of network edge 135 to a third-party server (e.g., an advertisement server), and the third-party server may return secondary content that is relevant for the location of network edge 135.

MEC device 120 may forward (at 10) the modified second manifest to client device 110 in place of the original second manifest that is provided by stream host 140. In some embodiments, MEC device 120 may optionally request (at 11) and receive (at 12) the selected secondary content from secondary source 150 (e.g., an advertisement server) before client device 110 issues a request for the secondary content. In some other embodiments, MEC device 120 may cache or may be prepopulated with a set of secondary content in local storage or local memory. The set of secondary content may correspond to advertisements from different advertising campaigns that are relevant to the region or location of network edge 135 such that the advertising campaigns can be fulfilled by presenting the advertisements to client devices 110 at network edge 135.

In some embodiments, the links, URLs, or other identifiers for the secondary content selected by MEC device 120 may resolve to an address of MEC device 120. Accordingly, when playback of the stream on client device 110 reaches the break, client device 110 may issue (at 13) a request for the secondary content with an address that routes directly to MEC device 120 at network edge 135. MEC device 120 may provide (at 14) the secondary content directly to client device 110. Thereafter, client device 110 may resume playback of the primary content by requesting a next set of segments of the stream or a next manifest listing the next set of segments of the stream from stream host 140.

In some embodiments, the links, URLs, or other identifiers for the secondary content selected by MEC device 120 may resolve to secondary source 150, stream host 140, or some device in network 130 other than MEC device 120. In some such embodiments, MEC device 120 may detect the client device 110 issued request for the secondary content, and may directly respond to the request with the secondary content.

Using MEC resources to modify the stream manifest at the network edge may provide several advantages over traditional advertisement insertion. For instance, traditional advertisement insertion may be based on inaccurate location tracking, such as the address of the client device. The address of the client device may be spoofed to seemingly come from a location other than the client device's actual physical location. The systems and methods provided herein base the advertisement selection on the location of the network edge (e.g., network edge 135) through which the content or stream is requested, rather than the addressing of the requesting and receiving client.

Moreover, address geolocation, even when not spoofed, may be less precise than using the location of the network edge. For instance, a client device may be assigned an Internet Protocol ("IP") address for network access. The IP address may be mapped to a large geographic region or a specific Internet Service Provider ("ISP") operating in one or more regions. Also, the client device may move across different network edges while using the same IP address. In this case, the IP address may locate the client device within a large region, whereas each network edge can pinpoint the location of the client device to specific areas within the larger region, and thereby more accurately identify the location of the client device than when using the address of the client device.

Figure 2:
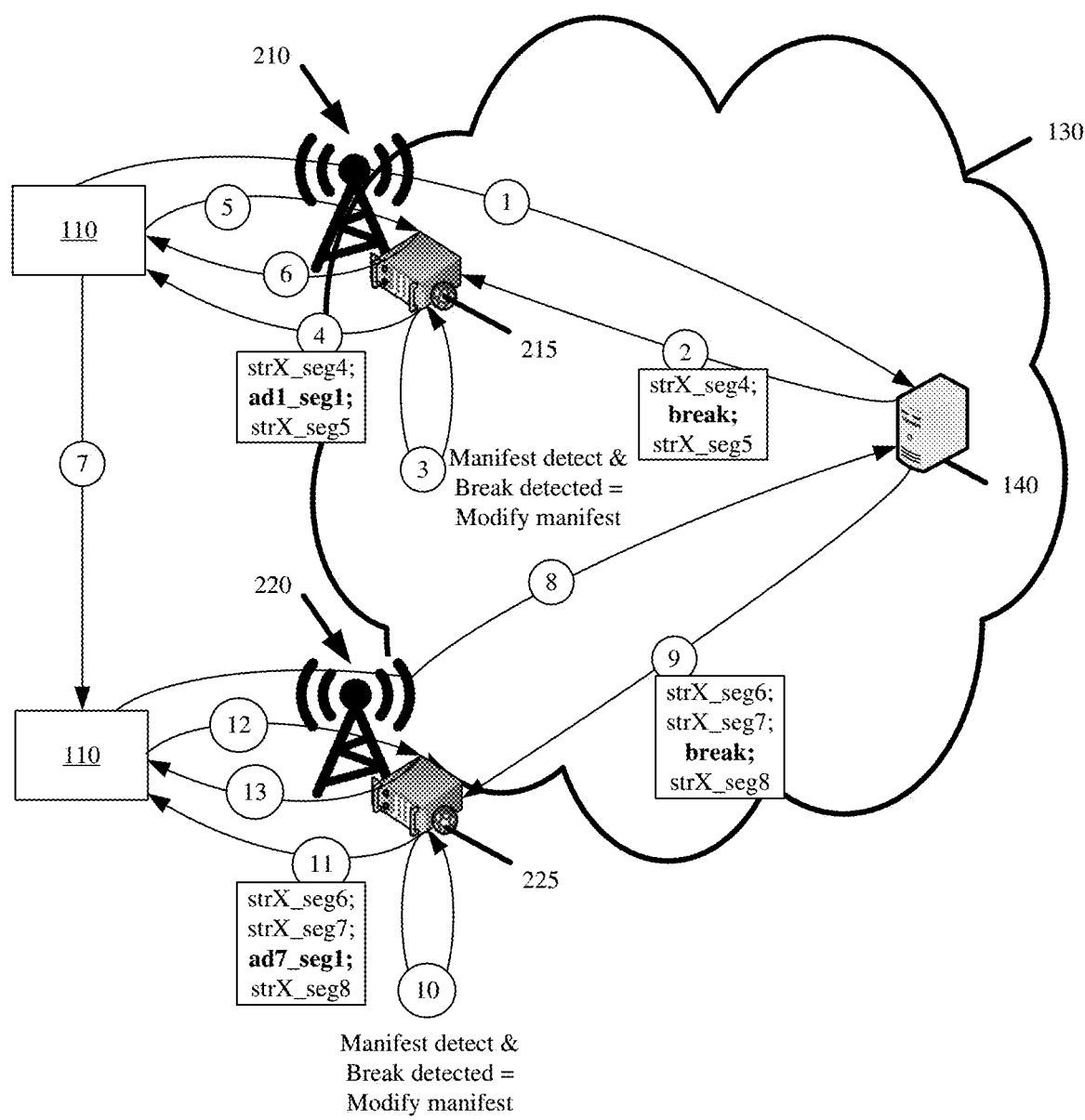
FIG. 2 illustrates an example of using MEC resources at different network edges to embed different secondary content in a stream based on different locations associated with each network edge in accordance with some embodiments described herein.

FIG. 2 illustrates an example of using MEC resources at different network edges to embed different secondary content in a stream based on different locations associated with each network edge in accordance with some embodiments described herein. In particular, the MEC resources provide different customizations of the stream for a particular client device based on the particular client device gaining network access from different network edges.

As shown in FIG. 2, client device 110 may initially access network 130 via first network edge 210. Client device 110 may request (at 1) a particular stream or a manifest for the particular stream from stream host 140 via first network edge 210. For instance, the request enters network 130 via first network edge 210, and routes to stream host 140. Stream host 140 may respond (at 2) with a first manifest.

First MEC device 215, at first network edge 210, may inspect the first manifest and/or other traffic flowing to client devices connected to network 130 via first network edge 210. First MEC device 215 may determine (at 3) that the first manifest includes a first break, and/or may modify (at 3) the first manifest to include a link or URL to first secondary content at or during the first break. First MEC device 215 may select the first secondary content for its geographic relevance to the service region or location of first network edge 210. For instance, the first secondary content may include a first advertisement or promotion for a first business that is within a specific distance of first network edge 210. Alternatively, the first secondary content may include an advertisement from a first set of advertising campaigns that are configured for presentation to client devices gaining network access via first network edge 210. The link or URL to the first secondary content may include a domain name, address, and/or other identifier for accessing and/or requesting the first secondary content from first MEC device 215.

First MEC device 215 may provide (at 4) the modified first manifest, instead of the original first manifest sent by stream host 140, to client device 110 via first network edge 210. Upon client device 110 reaching the first break in the modified first manifest, client device 110 may issue (at 5) a request for the first secondary content to first MEC device 215, and first MEC device 215 may provide (at 6) the first secondary content to client device 110 in reply to the request. In some embodiments, client device 110 may establish a network connection with first MEC device 215 based on the domain name, address, and/or other identifier from the first MEC device 215 inserted link or URL prior to issuing (at 5) the request for the first secondary content to first MEC device 215.

Client device 110 may then move (at 7) to another location where network access is obtained via second network edge 220. For instance, client device 110 may be a smartphone or other mobile wireless telecommunications device. Upon changing physical locations, a wireless telecommunications network may handoff client device 110 from a first base station at first network edge 210 to a second base station at second network edge 220, and client device 110 may receive uninterrupted network access from second network edge 220.

Client device 110 may then submit (at 8) a second request for the particular stream or a second manifest of the particular stream. The second request enters network 130 via second network edge 220, and routes to stream host 140.

Stream host 140 replies by providing (at 9) the second manifest. The return path for the second manifest may pass through second network edge 220. Accordingly, second MEC device 225 may detect, intercept, and/or inspect the second manifest and/or other traffic passing to client devices that connect to network 130 via second network edge 220.

Second MEC device 225 may determine (at 10), based on the inspection of the second manifest, that the second manifest includes a second break. Second MEC device 225 may select second secondary content to present during the second break, and may modify (at 10) the second manifest to include a link or URL to the second secondary content at or during the second break. The second secondary content may be geographically relevant to the service region or location of second network edge 220. For instance, the second secondary content may include a different second advertisement or promotion for a different second business that is within a specific distance of second network edge 220, and that is not within the specific distance of first network edge 210. Alternatively, the second secondary content may include an advertisement from a different second set of advertising campaigns that are configured for presentation to client devices gaining network 130 access via second network edge 220, but that are not configured for presentation to client devices gaining network 130 access via first network edge 210.

Second MEC device 225 may provide (at 11) the modified second manifest, instead of the original second manifest sent by stream host 140, to client device 110 via second network edge 220. Upon client device 110 reaching the second break in the modified second manifest, client device 110 may issue (at 12) a request for the second secondary content to second MEC device 225, and second MEC device 225 may provide (at 13) the second secondary content to client device 110 in reply to the request.

Figure 3:
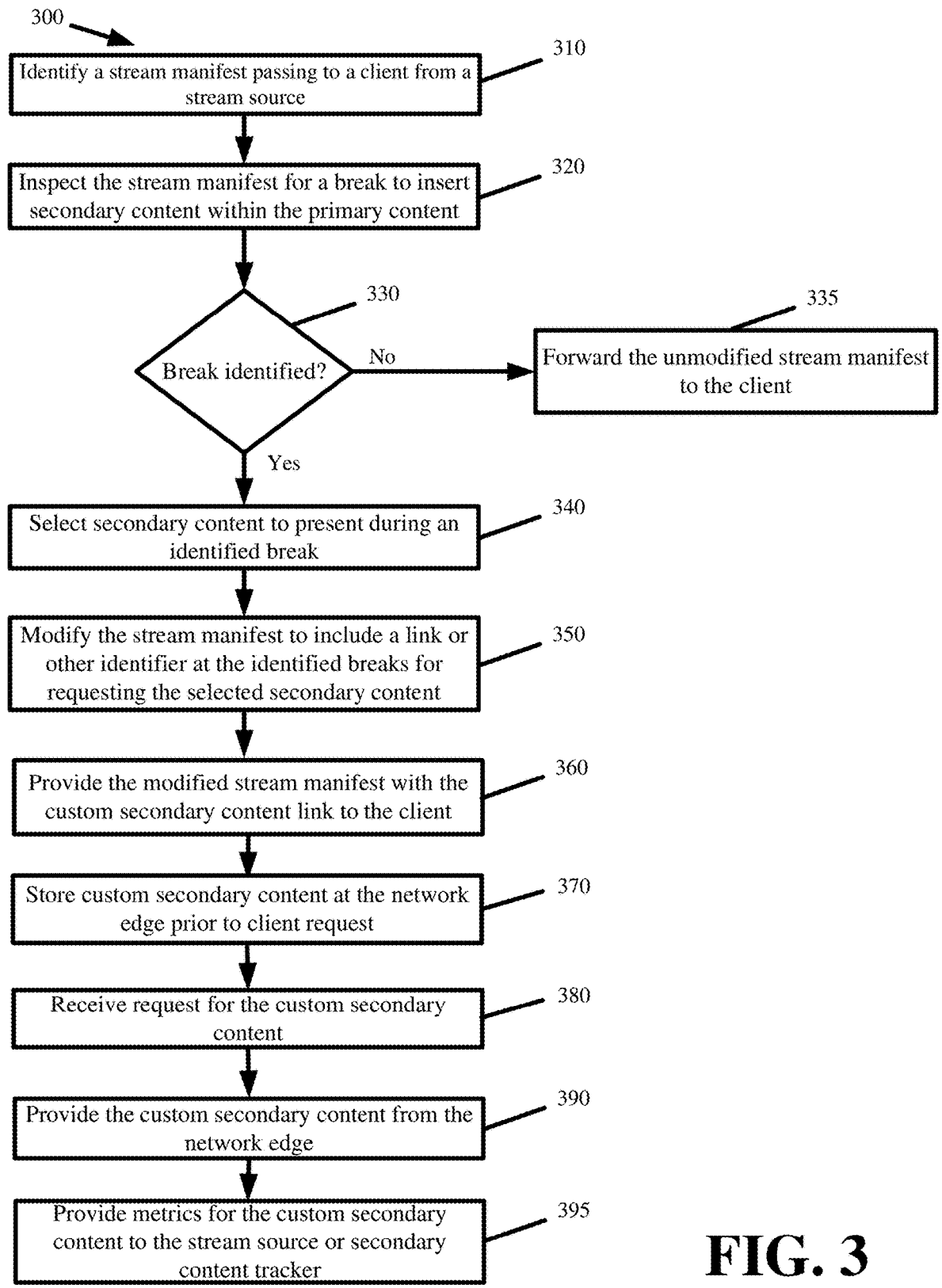
FIG. 3 presents a process for manifest manipulation at the network edge to support insertion of customized secondary content as part of primary content of a media stream in accordance with some embodiment described herein.

FIG. 3 presents a process 300 for manifest manipulation at the network edge to support insertion of customized secondary content as part of primary content of a media stream in accordance with some embodiment described herein. Process 300 may be performed by a MEC device that operates at or near the network edge. More specifically, MEC device may be located in the network path by which network traffic passes to and from the client devices that are connected to a data network via the network edge, and/or that access content from the data network via the network edge.

Process 300 may include monitoring (at 310) downstream traffic at or near a particular network edge. The downstream traffic may include content, packets, and/or data that are intended for or that pass to client devices that gain network access via the particular network edge. In some embodiments, the monitoring (at 310) may be limited to monitoring a particular subset of the downstream traffic. For instance, the MEC device, that performs the monitoring (at 310), may filter out traffic that is not a stream manifest. In other words, the MEC device may monitor for *.m3u8 file types, other manifest file types, and/or other manifest identifiers. In some embodiments, the monitoring may be further limited to traffic that is sent from particular source addresses associated with stream hosts that use the MEC resources for the manifest manipulation. For instance, a particular stream provider may contract with a network that controls the MEC devices at the different network edges for the customized secondary content insertion to occur at the network edges for streams of the particular stream provider.

Process 300 may include inspecting (at 320) manifests that are detected as a result of monitoring (at 310) the downstream traffic. In particular, the MEC device, that monitors the downstream traffic, may inspect (at 320) a manifest to determine (at 330) if the manifest includes one or more breaks. In some embodiments, inspecting the manifests may include temporarily intercepting the manifests, and preventing the manifests from continuing down the network path to the intended recipient. As noted above, a break may be detected based on the presence of specific tags, markers, and/or other identifiers in the manifest, or based on changing domain names, URLs, and/or other links specified in the manifest playlist.

In some embodiments, the stream originator and/or stream distributor may include one or more tags or identifiers with one or more breaks to assist the MEC device in detecting the breaks, whereas other breaks that do not include the one or more tags may be undetected by the MEC device. The tagging of the breaks provides the stream originator and/or the stream distributor with granular control over which breaks are detected and modified by the MEC device, rather than let the MEC device detect and modify all or none of the breaks. For instance, a break in a first manifest may include a special tag (e.g., MEC_break) that the MEC device scans for in order to determine if the first manifest includes a break that should be modified with custom secondary content at the particular network edge. A break in a second manifest may omit the special tag, and the MEC device may therefore ignore that break and/or determine that the second manifest does not include a break that should be modified with custom secondary content at the particular network edge.

In response to determining (at 330—No) that a particular manifest does not include any breaks that should be modified with custom secondary content at the particular network edge, process 300 may include forwarding (at 335) the particular manifest without modification to the intended recipient via the particular network edge. In other words, the MEC device allows the original manifest to pass through the particular network edge to the intended client device.

In response to determining (at 330—Yes) that the particular manifest includes one or more breaks that should be modified with custom secondary content at the particular network edge, process 300 may include selecting (at 340) secondary content to present during an identified break, and modifying (at 350) the particular manifest to include links or other identifiers at the one or more breaks with which the receiving client device can request and/or access the secondary content from the MEC device.

In some embodiments, the selection of the secondary content may be from one or more advertising campaigns that are configured at the particular network edge. For instance, a business may operate within a distance from the particular network edge, and may want to appeal to nearby users. Accordingly, the business may set up an advertising campaign that disseminates advertisements or messages for the business to client devices that gain network access from the particular network edge.

In some embodiments, the selection of the secondary content may be based on the MEC device querying a third-party broker using location information of the particular network edge, and obtaining secondary content that is relevant for the particular network edge location. For instance, the MEC device may request advertisements that are relevant for particular geolocation coordinates of the particular network edge from a third-party advertisement server.

In some embodiments, the selection of the secondary content may be further customized based on user preferences. For instance, the MEC device may obtain the user agent, user preferences, and/or other information from a subscriber database or other device in the network that stores user profiles for client devices that access the network via different network edges of the network. The MEC device may also obtain the user agent, user preference, and/or other information from messaging sent and received by the client device.

The MEC device may use the user-specific or client-device specific information to select secondary content from configured campaigns, or to submit as part of querying a third-party advertisement server for advertising that is not only relevant for the network location associated with the particular network edge, but also the user that receives the advertisement on the client device. For instance, the MEC device may determine that a user associated with a client device requesting a stream from the particular network edge prefers a particular type of food, and may select an advertisement (e.g., secondary content) for a restaurant that is within some distance of the particular network edge, and that offers that particular type of food.

Process 300 may include providing (at 360) the modified manifest in place of the particular manifest, that was obtained from monitoring (at 310) the downstream traffic. The modified manifest may differ from the original or unmodified particular manifest by including links, URLs, and/or other identifiers for secondary content that is dynamically selected at the particular network edge, and/or that is inserted into one or more breaks of the particular manifest before the modified manifest is passed through the particular network edge. The modified manifest may be issued from the MEC device through the particular network edge to the client device that requested the original and unmodified particular manifest from a stream host in the network.

Process 300 may include storing (at 370) a copy of the selected secondary content in local memory of the MEC device prior to the client device, that receives the modified manifest, requesting the selected secondary content. In some embodiments, the MEC device may periodically receive secondary content for different campaigns that are to be fulfilled or completed at the particular network edge, and may store (at 370) the received secondary content in local memory. Fulfillment or completion of a campaign may include distributing and/or obtaining a certain number of impressions for the secondary content from client devices at the particular network edge. In some embodiments, the MEC device may prefetch the selected secondary content from a third-party device (e.g., an advertisement server or advertisement broker), and may cache the selected secondary content prior to the client device requesting the selected secondary content.

Process 300 may include receiving (at 380) a request, from the client device, that is directed to the URL or link inserted into the modified manifest, and that is for the secondary content selected and/or inserted at the particular network edge by the corresponding MEC device operating at or near the particular network edge. Specifically, the request may be addressed and/or routed to the MEC device operating at or near the particular network edge.

In response to receiving the request, process 300 may include (at 390) providing the selected secondary content from cache or local storage of the MEC device, and further providing (at 395) metrics regarding the secondary content to the stream host or a third-party that tracks viewership of the secondary content. The MEC device may provide (at 395) the metrics because the manifest manipulation and dynamic insertion of the secondary content at the particular network edge may otherwise prevent the stream host or third-party from directly tracking the metrics. The metrics provide a means by which the stream host can monetize the streaming content while also leveraging the MEC resources to provide secondary content that is geographically relevant for each network edge where the streaming content is accessed.

In some embodiments, the MEC devices may be used to modify or customize the primary content of a stream in addition to or instead of customizing the secondary content presented during breaks in the primary content. For instance, a stream host may black-out a stream when that stream is requested from certain network edges (e.g., locations associated with those network edges). Rather than present the blacked-out content to client devices accessing the network from those network edges, the MEC devices at or near those network edges may modify the manifests to replace the blacked-out primary content with different substitute content.

As another example, a stream host may provide a stream manifest that includes segments of a national feed or program (e.g., a news feed from a national news network). One or more MEC devices at specific network edges, where a substitute local feed or local program is available, may detect the manifests for the national feed, and may modify the stream manifests by replacing segments of the national feed or program with segments of the local feed or program (e.g., a local news feed from a local affiliate of the national news network).

In addition to, or in lieu of, leveraging MEC resources and the location of the MEC resources at the network edge for customizing content based on the network edge location, some embodiments leverage the MEC resources and the location of the MEC resources at the network edge to significantly lower latency for starting and/or playing back a stream on client devices that access the stream via the network edge. In particular, the systems and methods herein may reduce the start time for a stream to under a second, and may also reduce the playback delay of a live stream relative to a broadcast or Over-The-Air ("OTA") feed of the same stream.

Typically, live streams delivered over a data network are delayed relative to broadcast or OTA feeds of the same streams by several seconds. The playback delay may be due to the network distribution architecture used to deliver streams over a data network, and also due to the number of network hops the streams traverse before arriving at a client device.

For instance, a live stream may be encoded by one or more encoders into stream segments. Each stream segment may be a file that encodes some small duration of the overall stream. The encoders may directly or indirectly upload each encoded stream segment to one or more origins (e.g., servers or other devices from which the encoded stream may be accessed). The origins may retain the stream in cache or storage until it is requested by a client device, whereas broadcast or OTA feeds immediately place the stream on the cable, fiber, wire, airwave, or other medium that reach the end user.

A client device may access a live stream over the data network by submitting an initial request for a manifest of the live stream. The request is directed to a URL that includes the domain name of the stream host. Before the request can be sent, the domain name may be resolved to an address of the stream host. The address may then be inserted in a packet that encapsulates the request. The request may be issued by the client device, and may enter the network via the network edge.

The request may traverse several network hops before arriving at the stream host. The stream host is likely to be different than the one or more origins that receive the encoded stream segments from the encoders. The stream host may be a Content Delivery Network ("CDN") or other "cloud" or distributed platform that redistributes the stream from the one or more origins to requesting client devices across the network. The CDN may have a distributed footprint with many servers at different points-of-presence within the network. Accordingly, the CDN has sufficient capacity to handle demand for large numbers of client device, whereas the origins may have fewer resources, and may therefore depend on the CDN for the redistribution.

The request may result in a cache miss at the stream host since the stream host has yet to retrieve the stream from the origin. In response to the cache miss, the stream host may then request the live stream (e.g., a manifest and/or one or more segments of the live stream) from the origin. The origin provides the manifest to the stream host, the stream host forwards the manifest to the client device.

By referencing the manifest, the client device may request a first segment of the live stream from the stream host. The request for the first segment may once again result in a cache miss at the stream host, and may cause the stream host to retrieve the first segment from the origin. The origin may be unable to provide the first segment until the encoder has completely encoded the duration of the stream contained by the first segment, and has uploaded the encoded file for the first segment to the origin. The origin may provide the first segment to the stream host, the stream host may cache the stream segment, and may forward the first segment to the client device. Here again, the stream host may be unable to forward the first segment to the client device until it has received the entire file encoding the first segment. Once the first segment is passed to the client device, the client device may decode and render the received segment in order to start playback. These operations may take several seconds to complete, and may account for the delay between a live stream and a corresponding broadcast or OTA feed of the same stream.

To eliminate much of the delay associated with starting and playback of a stream, systems and methods are provided to leverage the MEC resources at the network edge for prefetching the stream to the network edge in advance of client devices requesting the stream, and for serving the stream from the network edge.

The MEC resources at each network edge are limited in compute power, and are also limited in the memory or storage that is available for storing content. Accordingly, the systems and methods are adapted to prefetch and serve a subset of streams that client devices request through a network edge, and to serve the subset of streams with extremely low latency from the network edge while other streams are served from resources within the network (e.g., a CDN, cloud platform, stream originator, or another stream host). In some embodiments, the systems and methods may also preserve MEC resources by overwriting the cache at the network edge to retain segments for a current or most recent duration of the stream.

Figure 4:
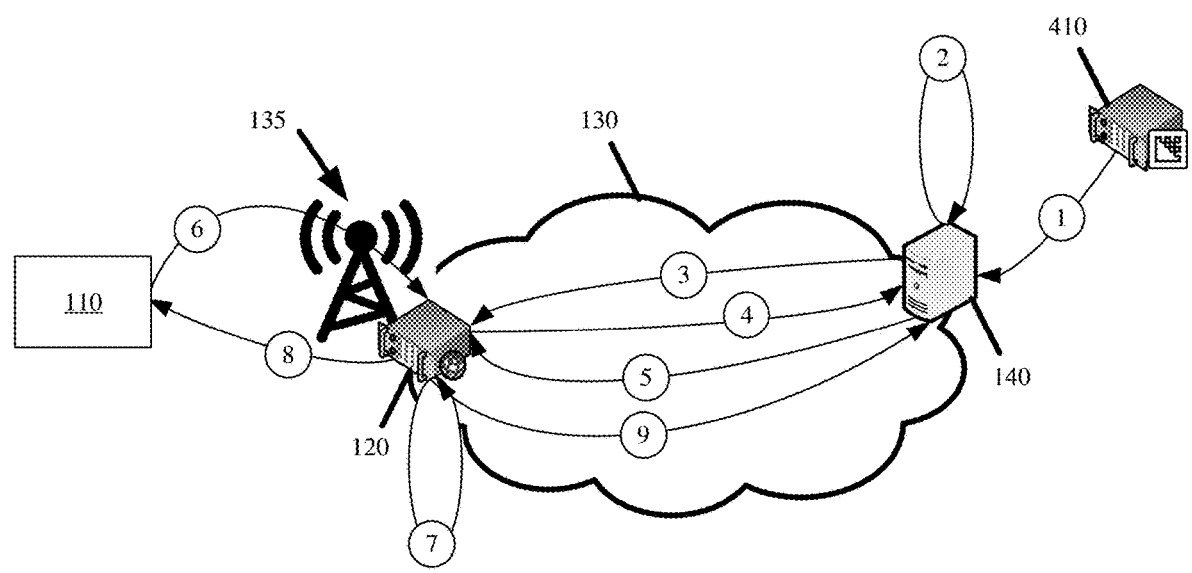
FIG. 4 illustrates an example for providing a stream with extremely low latency from the network edge in accordance with some embodiments described herein.

FIG. 4 illustrates an example for providing a stream with extremely low latency from the network edge in accordance with some embodiments described herein. FIG. 4 includes client device 110, MEC device 120 at network edge 135, network 130, stream host 140, and encoder 410.

Encoder 410 may encode a live event or other program as it occurs into a series of stream segments. Encoder 410 may upload (at 1) each encoded stream segment to stream host 140. In particular, encoder 410 may upload each encoded stream segment to a publishing point in a CDN, and the publishing point may make the stream segment available at other distribution points of the CDN. Stream host 140 may correspond to a CDN distribution point.

Stream host 140 may determine (at 2) that the uploaded stream should be prioritized at network edge 135 relative to other streams, and should be streamed with extremely low latency from network edge 135. The prioritization of the stream may be based on expected demand, a request from the stream originator, internal prioritization criteria of stream host 140, and/or other methods of differentiating delivery of the stream from other streams. The selective prioritization of the stream from the network edge may be performed to limit usage of the limited MEC resources, and may be used to offer extremely low latency streaming from the network edge at an additional cost to stream originators that desire a higher quality of service and/or improved user experience.

In some embodiments, encoder 410 may attach a tag or identifier with the uploaded stream. The tag or identifier may be part of the segment name, a header parameter, the metadata of the stream, and/or part of a configuration that is provided to stream host 140. The tag or identifier may signal the prioritization of the stream relative to other streams, and/or trigger usage of the MEC resources to provide the stream from network edge 135 and/or other network edges with extremely low latency.

For instance, the stream originator may provide stream host 140 with a configuration. The configuration may include an entry that prioritizes delivery of a particular stream from one or more network edges sometime in the future when the particular stream is to occur. In some embodiments, the tag or identifier may indicate a subset of the network edges where the stream should be prioritized. For instance, the stream originator may prioritize a live sporting event that is expected to receive large demand from one or more regions that correspond to one or more network edges.

In response to determining (at 2) that the uploaded stream should be prioritized at network edge 135, stream host 140 may provide (at 3) a prioritization message to MEC device 120 at network edge 135. In some embodiments, stream host 140 may be configured with the addressing of MEC devices at different network edges where the extremely low latency streaming is supported or can be implemented. Stream host 140 may use the MEC device addressing to provide the prioritization message to specific MEC devices.

The prioritization message may include a URL or other identifier for accessing the prioritized stream from stream host 140. In some embodiments, the prioritization message may include a manifest that is sent directly to MEC device 120 and/or a manifest that is tagged to identify the corresponding stream as one that is to be prioritized and served from network edge 135.

In some embodiments, the prioritization message may include a digital signature for stream host 140. The digital signature may be created using a private key of stream host 140. The digital signature may be used to limit which devices can trigger the caching and streaming of streams by MEC devices at different network edges. For instance, MEC device 120 may provide the extremely low latency streaming from network edge 135 in response to prioritization messages that include a digital signature identifying a particular CDN or stream originator, and may ignore prioritization messages from others that lack the digital signature, or provide a digital signature of an unsupported CDN or stream originator.

Instead or in addition of directly sending the prioritization message to one or more specific MEC devices, the MEC devices at the different network edges may listen on a particular broadcast address or join a particular multicast group, and stream host 140 may issue the prioritization message to the particular broadcast address or multicast group with the names, addressing, and/or other identifiers of different network edges or MEC devices at network edges where the stream should be prefetched, cached, and/or served with extremely low latency. For instance, in FIG. 4, the prioritization message may be sent to a multicast group with an identifier for MEC device 120 or network edge 135. MEC device 120 may join the multicast group and receive the prioritization message.

In any case, MEC device 120 may receive (at 3) the prioritization message from stream host 140, and may immediately begin requesting (at 4) the stream from stream host 140 prior to MEC device 120 receiving any requests for the stream from client device 110 or other client devices 110. In other words, MEC device 120 may prefetch (at 4) the stream in response to receiving (at 3) the prioritization message from stream host 140.

MEC device 120 may request or prefetch (at 4) the stream by requesting one or more stream segments from stream host 140 when the prioritization message includes a manifest that lists the one or more stream segments. In some embodiments, the MEC device 120 may request or prefetch (at 4) the stream by requesting a manifest from stream host 140 when the prioritization message does not include the manifest, and after obtaining the manifest, MEC device 120 may prefetch one or more segments of the stream that are identified in the manifest.

In response to receiving (at 5) one or more of the stream manifest or one or more segments at MEC device 120, MEC device 120 may cache the stream manifest and/or segments in local storage or local memory of MEC device 120. While the prefetching occurs or after the prefetching of one or more stream segments is complete, client device 110 may issue (at 6) a request for the stream via network edge 135. The request may be directed to a URL. The URL may be used to request the stream, a manifest of the stream, and/or a segment of the stream identified in a stream manifest. The request may be directed and/or addressed to stream host 140. MEC device 120 may monitor (at 7) stream requests originating from client devices 110 that access network 130 via network edge 135.

Since client device 110 issues (at 6) a request for a stream that has been prioritized for delivery from network edge 135, MEC device 120 may intercept the request. For instance, MEC device 120 may monitor and/or intercept requests that are directed to URLs of prioritized streams, addressing of stream host 140, and/or that contain identifiers of a prioritized stream. More specifically, MEC device 120 may monitor requests for manifests (e.g., *.m3u8 files) originating from network edge 135, and may intercept requests for manifests of prioritized streams while allowing other requests to continue routing through network 130 to an intended destination.

In some embodiments, MEC device 120 may monitor and/or intercept client device requests for the prioritized stream based on stream host 140 redirecting or forwarding client device 110 to MEC device 120 in response to stream host 140 receiving a request for the prioritized stream from client device 110. In some embodiments, MEC device 120 may receive the request for the prioritized stream from client device 110 in response to stream host 140 modifying Domain Name System ("DNS") records to resolve requests (e.g., domain names) directed to the prioritized stream to an address of MEC device 120 at network edge 135. For instance, the DNS records may be modified to resolve requests for a prioritized stream to an Anycast address shared by MEC devices at different network edges. A request from client device 110 directed to the Anycast address may route to the closest MEC device, which in FIG. 4, is MEC device 120 at network edge 135. MEC device 120 may use other techniques to monitor and/or intercept requests for the prioritized stream that originate from client devices accessing network 130 via network edge 135.

MEC device 120 may receive the request issued by client device 110, and may determine (at 7) that the request is for a prioritized stream that has been designated for delivery directly from network edge 135. In response to MEC device 120 detecting the request for the prioritized stream, MEC device 120 may respond (at 8) to the request by providing a stream manifest or stream segment of the prioritized stream from cache (e.g., local memory or local storage of MEC device 120). In other words, MEC device 120 may respond to the request without the latency associated with requesting and/or retrieving the stream manifest or stream segment from stream host 140 or elsewhere in network 130. MEC device 120 may provide the manifest and/or segments with the significantly fewer number of network hops that are between client device 110 and MEC device 120 than are between client device 110 and stream host 140. Consequently, client device 110 receives the stream with extremely low latency from network edge 135, and may start or playback stream in as few as a several hundred milliseconds from when the stream was requested.

MEC device 120 may continue prefetching the prioritized stream from stream host 140, and may replace previous segments stored in cache with newly prefetched segments. For instance, MEC device 120 may retain segments that total five to twenty seconds worth of the prioritized stream in memory, and may replace each oldest segment with each newly encoded segment.

In some embodiments, MEC device 120 may periodically provide (at 9) stream metrics to stream host 140. The metrics may identify performance parameters associated with MEC device 120 serving the stream from network edge 135, the number of viewers, and/or stream parameters (e.g., playback duration by each client device, user agent of each client device, and/or playback, device, or user data). The metrics may provide stream host 140 with a complete picture of stream usage since MEC device 120 (and other MEC devices at different network edges) may intercept requests for the stream, and provide the stream without stream host 140 being able to track these requests and/or client devices.

An additional advantage of the extremely low latency streaming from the network edge is reduced traffic in network 130. In particular, MEC device 120 requests each manifest and segment of a particular stream once from stream host 140, and distributes those manifests and stream segments to each client device that requests the particular stream via network edge 135. Previously, each client device would submit a separate set of requests through network 130 to stream host 140, and stream host 140 would respond to each client device separately by redundantly providing the same manifests and stream segments to different client devices. Each client device that requests a particular stream, especially high definition or high-resolution streams, may consume one or more gigabytes of bandwidth from stream host 140 and/or network 130. Accordingly, streaming from the network edge can significantly reduce the load on the stream host 140, and the redundant transfer of stream traffic across network 130.

Figure 5:
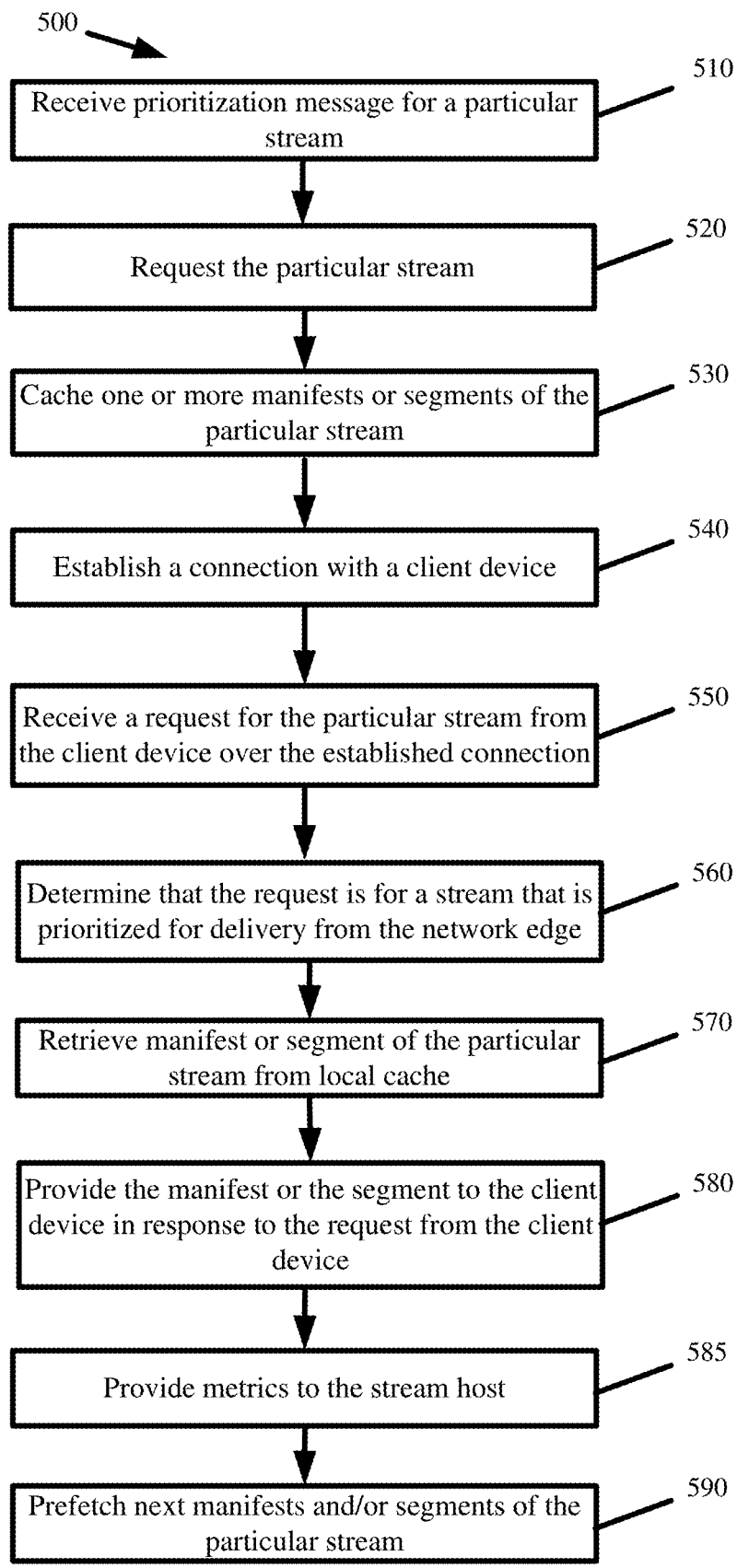
FIG. 5 presents a process for providing extremely low latency streaming at the network edge in accordance with some embodiments described herein.

FIG. 5 presents a process 500 for providing extremely low latency streaming at the network edge in accordance with some embodiments described herein. Process 500 may be performed by a MEC device that is located adjacent or at one or more network edges.

Process 500 may include receiving (at 510) a prioritization message from a stream host. As noted above, the prioritization message instructs the receiving MEC device to prefetch and serve a particular stream to client devices that request that particular stream from the network edge where the MEC device operates. The prioritization message may identify the particular stream by including a URL, manifest, or other identifier for accessing the particular stream from the stream host. For instance, the prioritization message may include a first manifest of the prioritized stream, and a tag, marker, or other identifier in the first manifest that prioritizes the stream for delivery from the MEC device and/or corresponding network edge.

In some embodiments, the stream host may directly address the prioritization message to specific MEC devices at network edges where the prioritized delivery of the stream from the network edge is desired. In some other embodiments, the prioritization message is passed to a multicast group or is broadcast. The MEC devices may join the multicast group or listen to the broadcast address in order to receive the prioritization message. In some such embodiments, the prioritization message may include identifiers that identify which of the MEC devices and/or network edges are to prefetch and provide the prioritized delivery of the stream from the network edge.

In response to receiving (at 510) the prioritization message, process 500 may include requesting (at 520) the particular stream from the stream host prior to a client device requesting the particular stream from the stream host or the MEC devices providing the prioritized delivery of the particular stream from the network edge. Process 500 may include caching (at 530) one or more of manifests or segments of the particular stream provided by the stream host in local storage or local memory of the MEC device.

Process 500 may then include establishing (at 540) a connection with a client device, that requests the particular stream and accesses the network from the network edge, and receiving (at 550) a request for the prioritized stream from the client device. In some embodiments, the connection may be initially established between the client device and the stream host, and may be transferred (e.g., redirected, handed-off, forwarded, etc.) from the stream host to the MEC device upon the stream host receiving a request for the prioritized stream from the client device.

Figure 6:
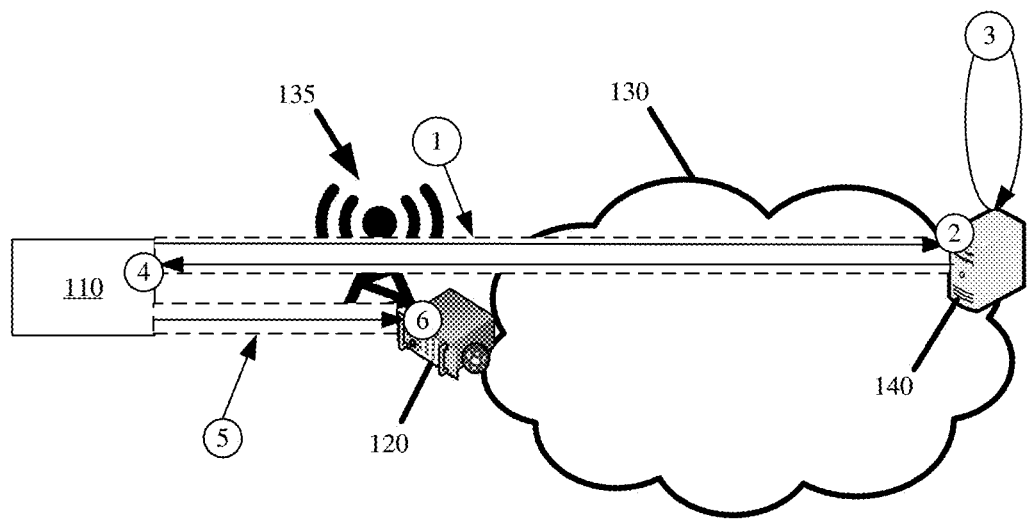
FIG. 6 illustrates an example of transferring a client device from the stream host to a MEC device at a network edge in accordance with some embodiment described herein.

FIG. 6 illustrates an example of transferring a client device from the stream host to a MEC device at a network edge in accordance with some embodiment described herein. As shown, client device 110 may establish (at 1) a Transmission Control Protocol ("TCP") connection or another network connection with stream host 140. Client device 110 may issue (at 2), via the established connection, an HTTP GET request or a streaming protocol request with a URL and/or other identifier identifying the prioritized stream. Stream host 140 may determine (at 3) that the prioritized stream is one that has been designated for delivery from network edge 135, and may further determine (at 3) that client device 110 accesses network 130 via network edge 135. Stream host 140 may determine (at 3) the network edge used by client device 110 to access network 130 based on one or more of the IP address, geolocation information, and/or other identifiers of client device 110. Alternatively, stream host 140 may determine (at 3) the network edge used by client device 110 to access network 130 based on a traceroute that traces the network path from stream host 140 back to client device 110.

In some embodiments, stream host 140 may handoff or move the connection endpoint to MEC device 120 at network edge 135. In some embodiments, and as shown in FIG. 6, stream host 140 may redirect (at 4) client device 110 to MEC device 120, thereby causing client device 110 to establish (at 5) a new connection with MEC device 120, and to resend (at 6) the prioritized stream request to MEC device 120 over the new connection.

With reference back to FIG. 5, after receiving (at 550) the prioritized stream request from the client device at the MEC device, process 500 may include determining (at 560) that the request is for the prioritized stream, and that the prioritized stream has been prioritized for delivery from the network edge. Accordingly, process 500 may include retrieving (at 570) a manifest or segment of the prioritized stream from local cache, without further access of the stream host or the data network, and providing (at 580) the manifest or segment to the client device in response to the request from the client device. Additionally, process 500 may include providing (at 585) metrics regarding the prioritized stream viewership, client devices and/or users accessing the prioritized stream, and/or other stream, user, or device parameters to the stream host.

Contemporaneously, process 500 may include prefetching (at 590) to the network edge and/or MEC device at the network edge, next manifests and/or next segments of the prioritized stream from the stream host prior to the next manifests and/or next segments being requested by client devices. Process 500 may continue prefetching the prioritized stream, and serving the prioritized stream from the network edge until the requests cease or the prioritized stream ends.

In some embodiments, a stream can be prepopulated at the network edge without using the prioritization message. In some such embodiments, a stream host may be directly able to access and populate the caches of different MEC devices with the manifests and/or segments of a prioritized stream. The MEC devices may then receive prioritized stream requests from client devices operating in the network edges near the MEC devices, and may serve the prioritized streams to the client devices directly from cache.

Figure 7:
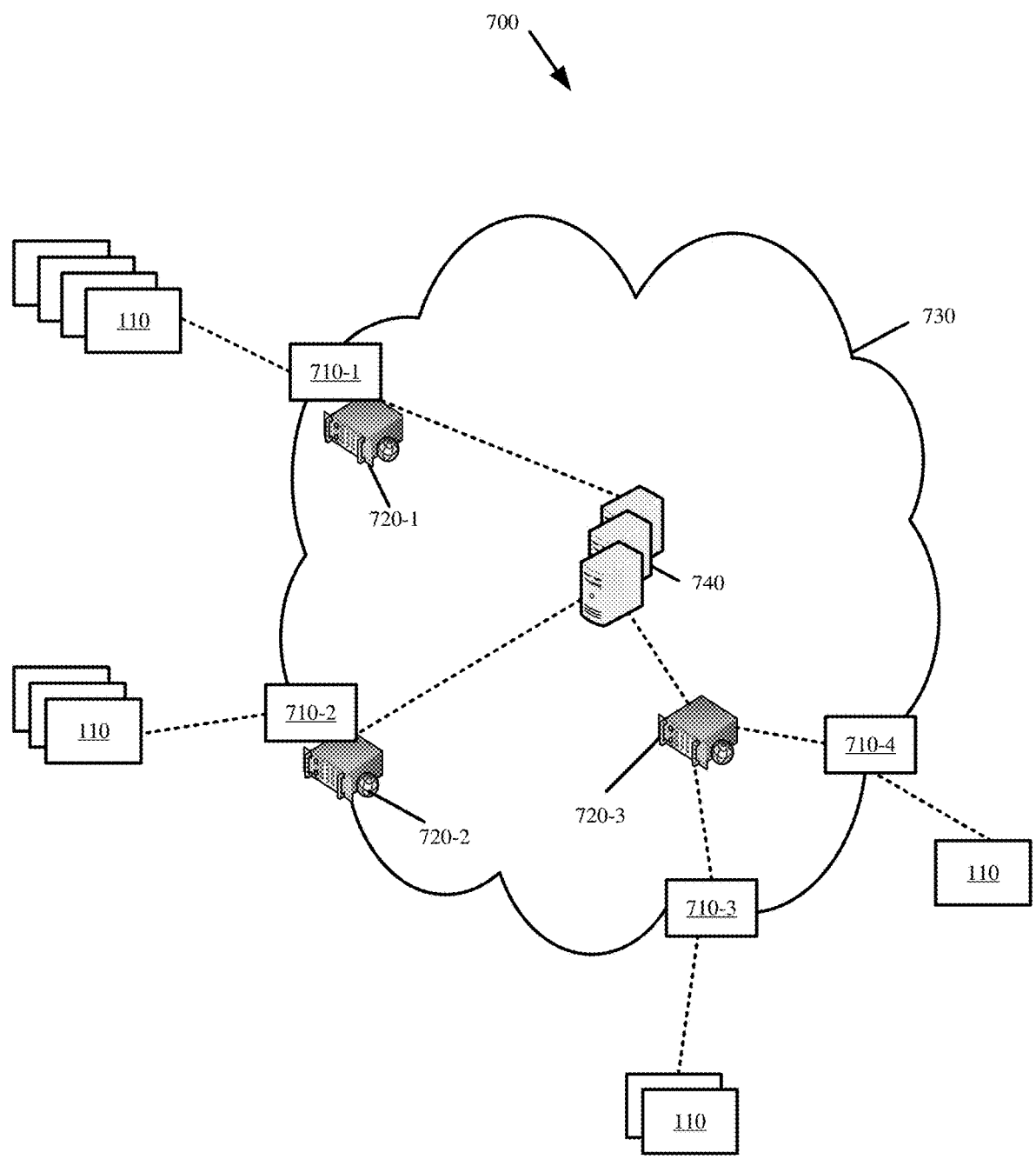
FIG. 7 illustrates an example network architecture for implementing the manifest manipulation at different network edges and/or the extremely low latency streaming using MEC resources at different network edges.

FIG. 7 illustrates an example network architecture 700 for implementing the manifest manipulation at different network edges and/or the extremely low latency streaming using MEC resources at different network edges. As shown in FIG. 7, network architecture 700 may include different network edges 710-1, 710-2, 710-3, and 710-4 (herein sometimes collectively referred to as "network edges 710" or individually as "network edge 710"), MEC devices 720-1, 720-2, and 720-3 (herein sometimes collectively referred to as "MEC devices 720" or individually as "MEC device 720"), network 730, and one or more stream hosts 740 that may leverage the MEC resources.

The devices, networks, and/or other components illustrated in FIG. 7 may correspond to the devices, networks, and/or other components illustrated and/or referenced in FIGS. 1-6 above. For instance, MEC device 720-1 may correspond to MEC device 120, network edge 710-1 may correspond to network edge 135, network 730 may correspond to network 130, and/or stream hosts 740 may correspond to stream host 140.

The number of devices, networks, and/or other components illustrated in FIG. 7 are provided for example purposes. Network architecture 700 may include more or less devices, networks, and/or components, and/or different devices, networks, and/or components. For instance, network architecture 700 may include various network routers, switches, and/or other network hops that provide the connections and/or network paths between network edges 710, MEC devices 720, and/or stream hosts 740.

Network edges 710 may be network access points by which different sets of client devices 110 may access network 730 for streaming content, services, and/or data. In some embodiments, network edge 710 may represent a service region of a wireless telecommunications network. The service region may be created by a base station that transmits wireless signaling over a geographic region. For instance, network edge 710 may be a RAN of a Third Generation ("3G"), Fourth Generation Long Term Evolution ("4G LTE"), Fifth Generation New Radio ("5G NR"), and/or another wireless telecommunications network. Network edge 710 may also include an on-site network access point. For instance, network edge 710 may be a WiFi, Bluetooth, or another wireless network that can be used to access network 730. Network edge 710 may also be a gateway router that connects wireless or wired client devices 110 in a Local Area Network ("LAN") to network 730. Network edges 710 may be operated and/or provided by an ISP, wireless telecommunications network operator, and/or another network service provider.

Each MEC device 720 may include configurable computing, caching, and/or other resources at or near one or more network edges 710. For instance, MEC devices 720-1 and 720-2 may each represent a server or set of configurable computing, caching, and/or other resources that are physically located at or next to a different base station creating network edge 710-1 or 710-2. MEC device 720-3 may be located at a hub or network intersection point for network edges 710-3 and 710-4. In some such embodiments, MEC device 720-3 may provide services, applications, and/or functionality for or to client devices 110 that access network 730 via network edge 710-3 or network edge 710-4.

Each MEC device 720 may be connected in the network path between one or more network edges 710 and network 730 such that the network traffic flowing between the one or more network edges 710 and network 730 passes through MEC device 720 in that network path. The resources of each MEC device 720 may be configured to provide different services, applications, and/or functionality for or to client devices 110 that access network 730 via network edges 710 at or near MEC device 720. Accordingly, MEC device 720 may monitor, intercept, and/or modify the network traffic as described in the above embodiments.

Each MEC device 720 may be accessed via different domain names, URLs, network addresses, and/or other identifiers. MEC devices 720 may be provided by network 730. For instance, a wireless telecommunications network may install a MEC device 720 at or near the base stations for one or more network edges 710 of the wireless telecommunications network. In some embodiments, MEC devices 720 may be operated by a third-party that is independent of the operator for network 730. For instance, MEC devices 720 may be operated by a CDN.

Network 730 may represent a wireless telecommunications data, a data network, and/or an interconnected set of networks that collectively form and/or provide access to different hosts 740 in the Internet. For instance, network 730 may be a 3G, 4G LTE, 5G NR, and/or other wireless telecommunications network with network edges 710 corresponding to different service regions of network 730, and with the core of network 730 being connected to other networks that collectively form the Internet. Network 730 may provide client devices 110 access to content, services, and/or data of different hosts 740 that are connected or interconnected to network 730 via one or more other networks.

Hosts 740 may be network accessible sites or devices that are in or connected to network 730, via one or more other networks. Hosts 740 may include sites or devices of content originators, content providers, and/or platforms from which different content, services, and/or data may be accessed via network 730. Hosts 740 may include distributed servers of a CDN or other cloud platform. Hosts 710 may be accessed via different domain names, URLs, network addresses, and/or other identifiers.

In some embodiments, hosts 740, that leverage MEC devices 720 for various functionality, may be configured with addressing of MEC devices 720. In some embodiments, hosts 740 may communicate with MEC devices 720 via different multicast groups or broadcast messages. Hosts 740 may communicate with MEC device 720 in order to send the prioritization messages for streams that are to be cached and directly delivered from one or more network edges 710. Similarly, MEC devices 720 may communicate with hosts 740 in order to provide metrics for secondary content or streams that are distributed by MEC devices 720 at network edges 710 on behalf of or for the benefit of hosts 740.

Figure 8:
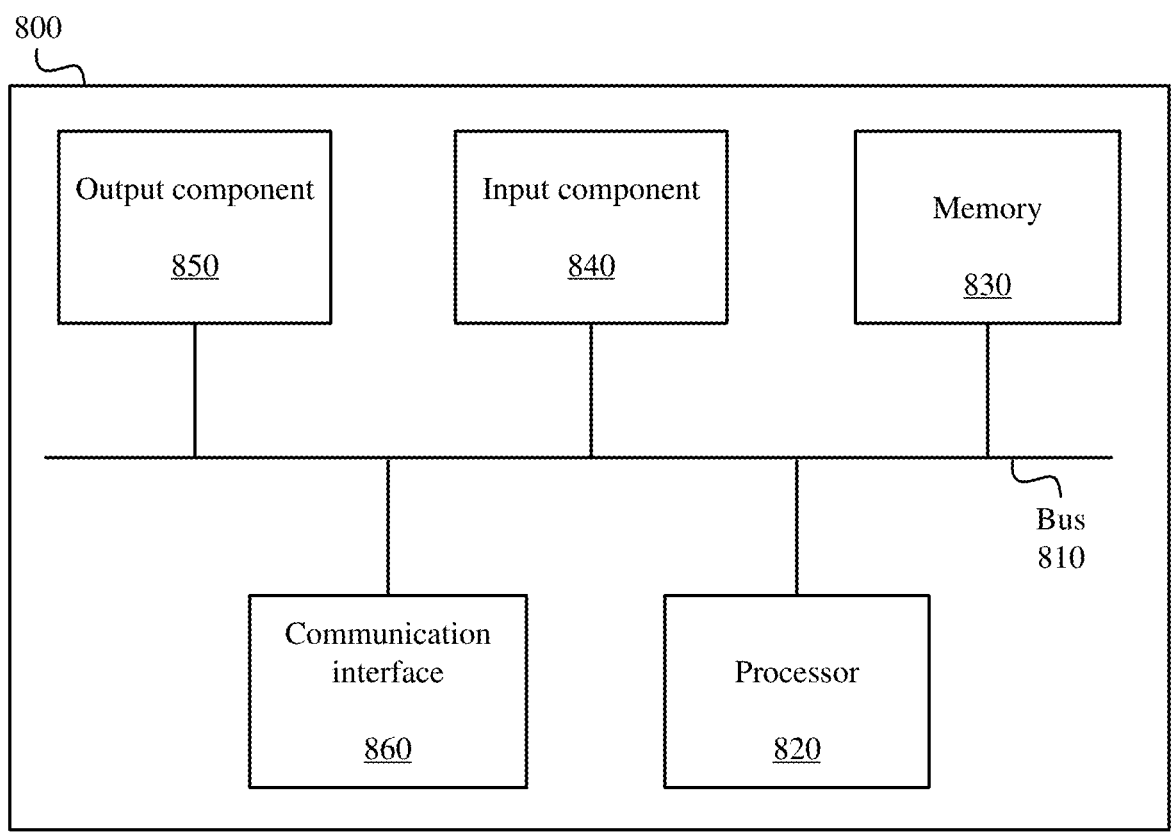
FIG. 8 is a diagram of example components of a device that is used to implement certain of the devices described above.

FIG. 8 is a diagram of example components of device 800. Device 800 may be used to implement certain of the devices described above (e.g., MEC devices 120 or 720, hosts 140 or 740, client devices 110, etc.) Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A device comprising:
   one or more processors configured to:
   monitor network traffic passing between a data network and one or more client devices that access the data network from a particular network edge;
   detect, at the particular network edge, an original manifest of a stream from said monitoring of the network traffic;
   identify a break in the original manifest, at which presentation of the stream is interrupted, prior to playback of the stream reaching the break, wherein the original manifest comprises links to a set of next segments of the stream, and wherein the break is located in the original manifest and starts between the links to a first next segment and a second next segment of the set of next segments;
   select content from a plurality of secondary content based on a geographic location of the particular network edge;
   modify, at the particular network edge, the original manifest by inserting a link to the content in between the link to the first next segment and the link to the second next segment; and
   provide a modified manifest, instead of the original manifest, to a client device via the particular network edge, wherein the modified manifest comprises the link to the content inserted in between the link to the first next segment and the link to the second next segment of the stream.

2. The device of claim 1, wherein the one or more processors are further configured to:
   detect a second original manifest of the stream;
   determine that the second original manifest does not include a break in the presentation of the stream; and
   provide the second original manifest unmodified to the client device via the particular network edge.

3. The device of claim 1, wherein the content is first content from the plurality of secondary content, and wherein the one or more processors are further configured to:
   detect the original manifest of the stream that is intended for a particular client device accessing the data network via a second network edge, wherein the second network edge is located at a different geographic location than the particular network edge;
select different second content from the plurality of secondary content based on the different geographic location of the second network edge; and
provide a modified manifest comprising a link to the second content, instead of the first content, to the particular client device accessing the data network via the second network edge.

4. The device of claim 1, wherein the one or more processors are further configured to:
cache the content into local memory or local storage of the device prior to the client device requesting the content; and
provide the content from the local memory or the local storage of the device in response to a request for the content from the client device.

5. The device of claim 4, wherein the one or more processors are further configured to:
provide one or more metrics, that are related to said providing the content, to a stream host, that sends the original manifest.

6. The device of claim 4, wherein the caching the content comprises:
requesting the content from a third-party server prior to the client device requesting the content from the device; and
storing the content in the local memory or the local storage in response to receiving the content from the third-party server.

7. The device of claim 1, wherein the original manifest is sent from a stream host, and wherein the link to the content comprises a Uniform Resource Locator ("URL") with a domain name or address of the device instead of the stream host.

8. The device of claim 1, wherein identifying the break comprises:
detecting a playlist of one or more segments that are directed to primary content of the stream; and
detecting within the playlist a tag, link, or segment that is directed to secondary content that is different than the primary content.

9. The device of claim 1, wherein the particular network edge corresponds to a Radio Access Network ("RAN") of a telecommunications wireless network, and wherein the device is located near a base station of the RAN.

10. The device of claim 1, wherein the content is an advertisement for an entity within a specified distance from the particular network edge.

11. The device of claim 1, wherein the one or more processors are further configured to:
block transmission of the original manifest from passing through the particular network edge to the client device.

12. The device of claim 1, wherein detecting the original manifest comprises:
determining that the stream associated with the original manifest is one of a set of streams that is configured for network edge content replacement, or is from one of a set of stream hosts that has requested network edge content placement.

13. The device of claim 12, wherein the one or more processors are further configured to:
detect a second manifest of a second stream;
identify a break in the second manifest at which presentation of the second stream is interrupted; and
provide the second manifest unmodified to a particular client device via the particular network edge based on the second stream not being one of the set of streams and a stream host providing the second stream not being one of the set of stream hosts.

14. A method comprising:
monitoring network traffic passing between a data network and one or more client devices that access the data network from a particular network edge;
detecting, at the particular network edge, an original manifest of a stream from said monitoring of the network traffic;
identifying a break in the original manifest, at which presentation of the stream is interrupted, prior to playback of the stream reaching the break, wherein the original manifest comprises links to a set of next segments of the stream, and wherein the break is located in the original manifest and starts between the links to a first next segment and a second next segment of the set of next segments;
selecting content from a plurality of secondary content based on a geographic location of the particular network edge;
modifying, at the particular network edge, the original manifest by inserting a link to the content in between the link to the first next segment and the link to the second next segment; and
providing a modified manifest, instead of the original manifest, to a client device via the particular network edge, wherein the modified manifest comprises the link to the content inserted in between the link to the first next segment and the link to the second next segment of the stream.

15. The method of claim 14 further comprising:
detecting a second original manifest of the stream;
determining that the second original manifest does not include a break in the presentation of the stream; and
providing the second original manifest unmodified to the client device via the particular network edge.

16. The method of claim 14, wherein the content is first content from the plurality of secondary content, the method further comprising:
detecting the original manifest of the stream that is intended for a particular client device accessing the data network via a second network edge, wherein the second network edge is located at a different geographic location than the particular network edge;
selecting different second content from the plurality of secondary content based on the different geographic location of the second network edge; and
providing a modified manifest comprising a link to the second content, instead of the first content, to the particular client device accessing the data network via the second network edge.

17. The method of claim 14 further comprising:
caching the content into local memory or local storage prior to the client device requesting the content; and
providing the content from the local memory or the local storage in response to a request for the content from the client device.

18. A device comprising:
one or more processors configured to:
monitor network traffic passing between a data network and one or more client devices that access the data network from a particular network edge;
detect an original manifest of a first stream from said monitoring of the network traffic;

determine that the first stream associated with the original manifest is one of a set of streams that is configured for network edge content replacement, or is from one of a set of stream hosts that has requested the network edge content placement;
identify a break in the original manifest at which presentation of the first stream is interrupted;
select content from a plurality of secondary content based on a geographic location of the particular network edge;
modify the original manifest to include a link to the content at the break;
provide a modified manifest comprising the link to the content to a first client device via the particular network edge;
detect a second manifest of a second stream;
identify a break in the second manifest at which presentation of the second stream is interrupted; and
provide the second manifest unmodified to a second client device via the particular network edge based on the second stream not being one of the set of streams, and a stream host providing the second stream not being one of the set of stream hosts.

\* \* \* \* \*